US010240921B2

(12) United States Patent
Scheiermann (10) Patent No.: US 10,240,921 B2
(45) Date of Patent: Mar. 26, 2019

(54) METHOD AND DEVICE FOR DETERMINING AN ANGLE OF ROTATION OF AN OBJECT ABOUT A ROTATION AXIS

(71) Applicant: ROBERT BOSCH GmbH, Stuttgart (DE)

(72) Inventor: Sergej Scheiermann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 308 days.

(21) Appl. No.: 15/029,702

(22) PCT Filed: Aug. 22, 2014

(86) PCT No.: PCT/EP2014/067887
§ 371 (c)(1),
(2) Date: Apr. 15, 2016

(87) PCT Pub. No.: WO2015/058883
PCT Pub. Date: Apr. 30, 2015

(65) Prior Publication Data
US 2016/0282112 A1 Sep. 29, 2016

(30) Foreign Application Priority Data
Oct. 23, 2013 (DE) .................. 10 2013 221 494

(51) Int. Cl.
G01B 21/22 (2006.01)
G01D 1/16 (2006.01)
E05F 15/611 (2015.01)
(52) U.S. Cl.
CPC ............ *G01B 21/22* (2013.01); *G01D 1/16* (2013.01); *E05F 15/611* (2015.01); *E05Y 2400/36* (2013.01)

(58) Field of Classification Search
CPC ...................................................... G01B 21/22
(Continued)

(56) References Cited

U.S. PATENT DOCUMENTS 6,873,931 B1 3/2005 Nower et al.
7,349,567 B2 3/2008 Leonard et al.
(Continued)

FOREIGN PATENT DOCUMENTS

EP 1959127 8/2008

OTHER PUBLICATIONS

International Search Report for PCT/EP2014/067887, dated Nov. 18, 2014.

*Primary Examiner* — Anthony Ho
(74) *Attorney, Agent, or Firm* — Norton Rose Fulbright US LLP; Gerard Messina (57) ABSTRACT

A method and a device for determining an angle of rotation of an object about a rotation axis. The method includes measuring a first acceleration profile of an acceleration sensor mounted on the object during a first period of time; and computing the angle of rotation by which the object has rotated about the rotation axis during the first period of time, based on the first accelerations during the first period of time and based on a predetermined distance of the acceleration sensor from the rotation axis. The device includes an acceleration sensor which is mountable on the object; and a computing device which is designed for determining the angle of rotation based on an acceleration profile measured by the acceleration sensor during a period of time, and based on a predetermined distance of the acceleration sensor from the rotation axis.

7 Claims, 7 Drawing Sheets

(58) Field of Classification Search
USPC .......................................................... 702/141
See application file for complete search history.

(56) References Cited

U.S. PATENT DOCUMENTS

2008/0046153 A1   2/2008   Oualkadi et al.
2010/0135800 A1   6/2010   Melius

METHOD AND DEVICE FOR DETERMINING AN ANGLE OF ROTATION OF AN OBJECT ABOUT A ROTATION AXIS

FIELD

The present invention relates to a method and a device for determining an angle of rotation of an object about a rotation axis.

BACKGROUND INFORMATION

Determining an angle of rotation of an object frequently takes place by measuring and integrating an angular velocity of the object. The angle of rotation may be an opening angle, for example, i.e., an angle of rotation with respect to a predetermined object position having a predetermined angular value for which the object is regarded as "closed." This may be an opening angle of windows or doors, for example.

Such applications are of interest for so-called "smart homes," for example, with the aid of which a user may monitor and/or control all relevant areas and objects within his/her home.

The angular velocity is generally measured with the aid of a rotation rate sensor (gyroscope). A more accurate determination of the angle of rotation generally requires a continuous measurement of the angular velocity, and imposes great demands on the stability of the angular velocity measurement. In particular, there are great demands on the stability with regard to systematic measuring errors of the rotation rate sensor, and on preferably short reaction times after waking up from a standby mode.

A method for determining an angle of rotation of an object is described in U.S. Pat. No. 7,349,567 B2. In the method, a sample image of the object in a certain position is provided.

Based on the sample image, projection sums are determined for a plurality of possible angular positions of the object. Projection sums are likewise computed for an image of the object in the angular position to be determined. The angular position whose projection sum most closely corresponds to the projection sum for the image of the object is determined for the object.

SUMMARY

A method for determining an angle of rotation of an object about a rotation axis is provided which includes the following steps: measuring a first acceleration profile of accelerations of an acceleration sensor mounted on the object during a first period of time; computing the angle of rotation by which the object has rotated about the rotation axis during the first period of time, based on the first acceleration profile during the first period of time and based on a predetermined distance of the acceleration sensor from the rotation axis.

Moreover, a device for determining an angle of rotation of an object about a rotation axis is provided which includes an acceleration sensor which is mountable on the object; and a computing device which is designed for determining the angle of rotation based on an acceleration profile measured by the acceleration sensor during a period of time, and based on a predetermined distance of the acceleration sensor from the rotation axis.

According to the present invention, because the rotation rate sensors generally used for determining angles of rotation of objects consume a comparatively large amount of power and represent a cost factor, the present invention provides a method and a device for determining an angle of rotation which are particularly energy-saving and/or which may be implemented in particular with few components. In particular, the use of a rotation rate sensor is avoided. Reduced power consumption may result in a longer service life, and thus, in a wider range of uses of the device. In addition, the reduced power consumption may make it possible to further decrease the size of the device, since an energy store of the device may be smaller and/or does not have to be replaced as often.

The computations necessary for completely or largely avoiding rotation rate sensors may be carried out by a computing device which is generally already provided in a smart home, for example in the form of a smart home controller.

According to one preferred refinement, the method according to the present invention includes the following steps: computing a first tangential velocity profile of tangential velocities of the acceleration sensor according to the measured first acceleration profile; and computing a first angular velocity profile of angular velocities about the rotation axis according to the first tangential velocity profile, and based on the predetermined distance of the acceleration sensor from the rotation axis. The computation of the angle of rotation is based on the computed first angular velocity profile. The first tangential velocity profile includes in particular velocities in the tangential direction with respect to rotation axis D. These velocities are thus perpendicular to velocities in the axial direction and to velocities in the radial direction with respect to rotation axis D.

According to another preferred refinement, the method includes the following steps: determining an offset of the acceleration sensor; and compensating for the determined offset of the acceleration sensor. In this way, the measurements on which the method is based become even more accurate.

According to another preferred refinement, the distance of the acceleration sensor from the rotation axis is determined using the following steps: measuring a second acceleration profile of the acceleration sensor during a second period of time; measuring a second angular velocity profile during the second period of time with the aid of a rotation rate sensor mounted on the object; computing a second tangential velocity profile of the acceleration sensor according to the measured second acceleration; and computing the distance of the acceleration sensor from the rotation axis, based on the computed second tangential velocity profile and the measured second angular velocity profile. Thus, the distance of the acceleration sensor from the rotation axis does not have to be measured manually and programmed, for example into the computing device, and instead may be computed automatically. The computation may take place on a regular or even a continuous basis, so that no computation errors result, even if the acceleration sensor shifts on the object.

According to another preferred refinement, the method includes the following steps: measuring a third angular velocity profile of the object about the rotation axis with the aid of a rotation rate sensor mounted on the object; and correcting the computed first angular velocity profile based on the measured third angular velocity profile. The method may become even more accurate in this way.

According to another preferred refinement, the measurement of the third angular velocity profile is carried out less frequently than the measurement of the first acceleration profile. This means that fewer measurements take place per unit of time. The rotation rate sensor for measuring the third angular velocity profile may in each case be awakened from an energy-saving standby mode, and in each case placed back into standby mode after the third angular velocity profile is measured. It is thus possible to consume a particularly small amount of power for the method according to the present invention when a rotation rate sensor is to be used. As an alternative to the standby mode, the rotation rate sensor may be completely switched off before and after each measurement.

According to another preferred refinement, the object is a door, and the rotation axis extends through hinges of the door. Alternatively, the object is a window, and the rotation axis extends through hinges of the window. The object may also be any other object which is rotatable about a rotation axis, such as a hatch, a pet door, a solar cell system, and so forth.

According to another preferred refinement, based on the computed angle of rotation and a predetermined angle of rotation threshold value it is ascertained whether the door or the window is open or closed. Depending on the result of the ascertainment, an OPEN/CLOSED signal is generated. The angle of rotation threshold value may correspond, for example, to an angle of rotation $\alpha_0$, for example 0°, for a closed door or closed window. However, an even larger tolerance threshold may be provided in which the angle of rotation threshold value is between approximately 0° and 30°, in particular between 0° and 15°, for example 10°. If the given angle of rotation is greater than the angle of rotation threshold value, the object is classified as OPEN, and is otherwise classified as CLOSED. This signal may contain identifying information about the object, and for example may be output to a user or may trigger an alarm signal.

According to one preferred refinement, the device according to the present invention includes a control device and a rotation rate sensor. The rotation rate sensor is designed for measuring an angular velocity profile of the object about the rotation axis. The rotation rate sensor may be placed into an energy-saving standby mode and awakened again from the standby mode by the control device.

BRIEF DESCRIPTION OF THE DRAWINGS

The present invention is explained in greater detail below with reference to the exemplary embodiments illustrated in the schematic figures.

Unless stated otherwise, identical or functionally equivalent elements and devices are provided with the same reference numerals in all figures.

DETAILED DESCRIPTION OF EXAMPLE EMBODIMENTS

Figure 1:
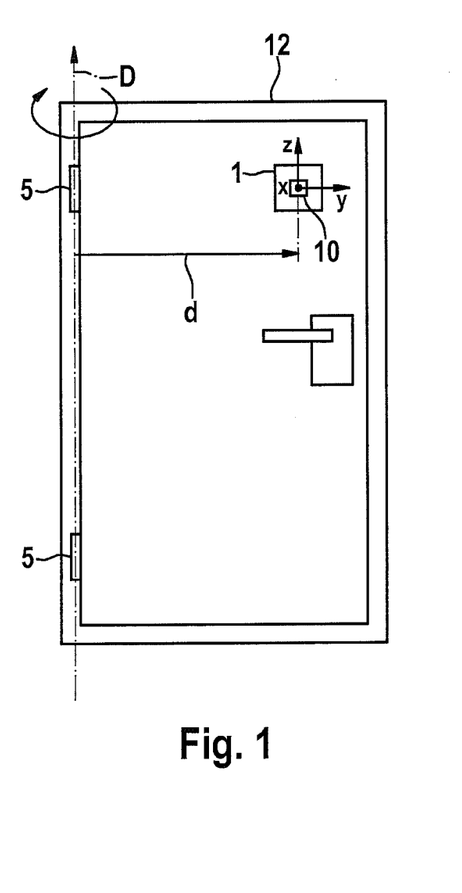
FIG. 1 shows a schematic front view of an object with a device mounted thereon for determining an angle of rotation of the object about a rotation axis according to a first specific embodiment of the present invention.

FIG. 1 shows a schematic front view of an object with a device mounted thereon for determining an angle of rotation of the object about a rotation axis according to a first specific embodiment of the present invention.

According to FIG. 1 (not true to scale), object 12, whose angle of rotation about rotation axis D is to be determined, is a door. Device 1 according to the present invention for determining the angle of rotation is mounted on object 12. An acceleration sensor 10 of device 1 is situated on object 12 at a radial distance d from rotation axis D.

To facilitate the description, a coordinate system having its origin on acceleration sensor 10 is illustrated in FIG. 1. A z axis of the coordinate system extends in parallel to rotation axis D, which extends through two hinges 5 of the door. A y axis of the coordinate system is situated at a distance from rotation axis D in the radial direction, and points in a direction away from rotation axis D. According to the right-hand rule, an x axis of the coordinate system is perpendicular to the z axis and the y axis, and points out of the plane of the drawing in a direction in which door 12 may open. Distance d is advantageously as great as possible. The acceleration sensor is designed for measuring accelerations, in particular linear accelerations, along the x axis.

Figure 2:
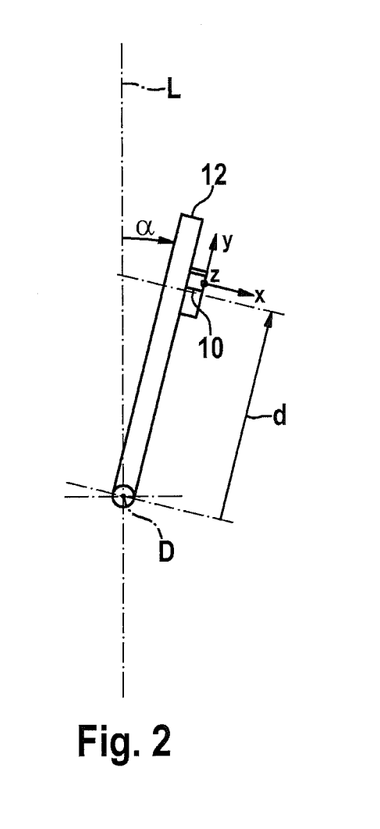
FIG. 2 shows a schematic cross section of the device according to the first specific embodiment, in the x-y plane.

FIG. 2 shows a schematic cross section of the device according to the first specific embodiment, in the x-y plane.

In FIG. 2, angle of rotation $\alpha$ is depicted as the opening angle of door 12, i.e., as the deflection angle of door 12 from a neutral position L. Neutral position L is associated with a "closed" state of door 12.

Figure 3:
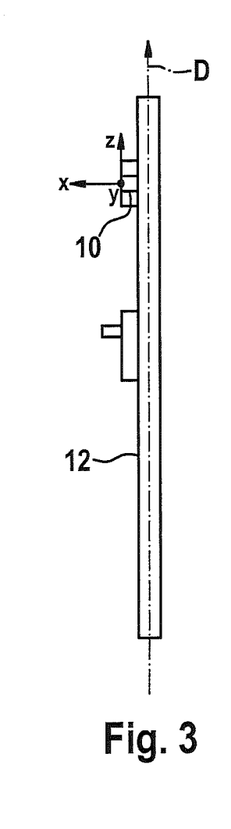
FIG. 3 shows a schematic longitudinal section of the device according to the first specific embodiment, in the x-z plane.

FIG. 3 shows a schematic longitudinal section of the device according to the first specific embodiment, in the x-z plane.

In FIG. 3 in conjunction with FIGS. 1 and 2, it is apparent that acceleration sensor 10 according to the first specific embodiment is situated in a housing in the form of a flat cuboid.

Figure 4:
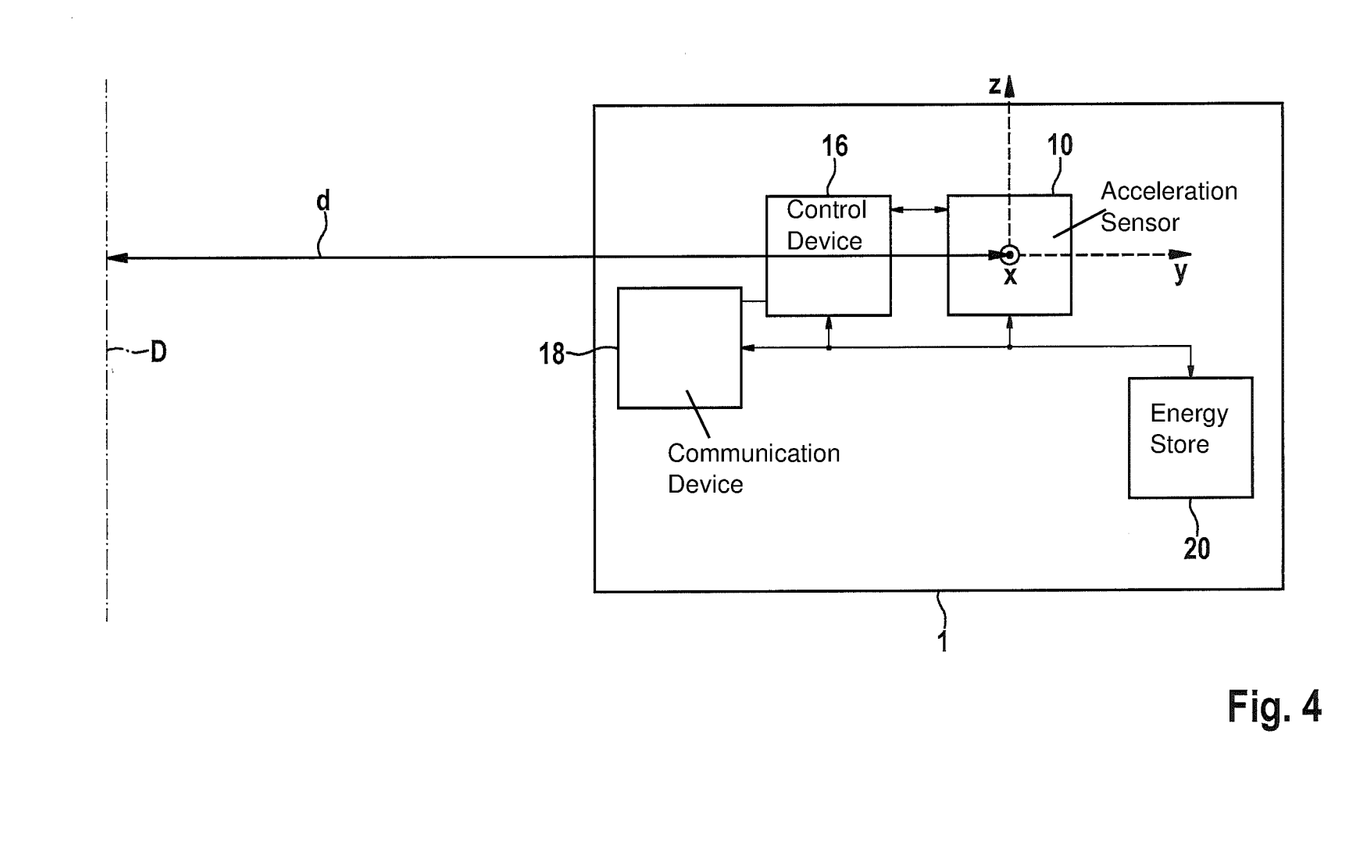
FIG. 4 shows a schematic block diagram of the device according to the first specific embodiment.

FIG. 4 shows a schematic block diagram of device 1 according to the first specific embodiment.

Device 1 includes a control device 16 with the aid of which acceleration sensor 10 is controllable. For example, control device 16 may be a microcontroller. Control device 16 may be designed for placing acceleration sensor 10 into an energy-saving standby mode or awakening it from same.

Device 1 also includes an energy store 20, which may be a rechargeable battery, for example, for supplying device 1 with electrical energy. The recharging may take place inductively or conductively, for example with the aid of a plug socket provided on the device. However, the battery may also be a nonrechargeable battery.

Control device 16 is connected to a communication device 18. Communication device 18 may at least transmit data, in particular measuring signals, to a computing device (not illustrated). The computing device may be part of a smart home, for example a smart home controller. The computing device may also be a server via which data may be retrieved over the Internet, for example. The computing device may determine an angle of rotation α (see FIG. 2) based on the acceleration profile measured by acceleration sensor 10 during a period of time, and based on predetermined distance d.

Figure 5:
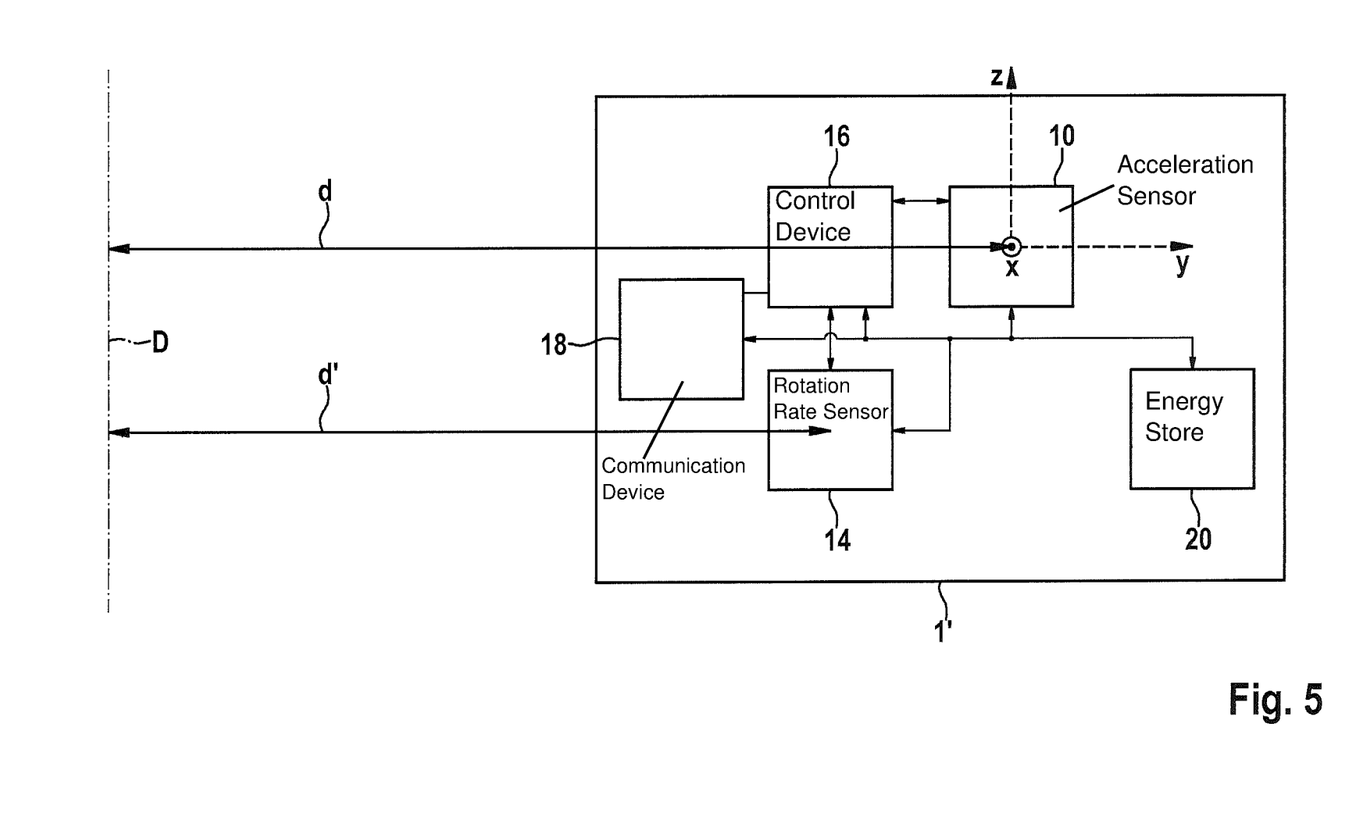
FIG. 5 shows a schematic block diagram of a device for determining an angle of rotation of the object about a rotation axis according to a second specific embodiment of the present invention.

FIG. 5 shows a schematic block diagram of a device 1' for determining an angle of rotation of the object about a rotation axis according to a second specific embodiment of the present invention.

Device 1' according to the second specific embodiment is a variant of the first specific embodiment, and in comparison to same also includes a rotation rate sensor 14 situated at distance d' from rotation axis D. Distance d' is advantageously equal to distance d in order to simplify certain computations, as explained below. Rotation rate sensor 14 measures angular velocities of device 1', in particular about rotation axis D. Rotation rate sensor 14 is also controllable, and may be placed into an energy-saving standby mode and awakened from same, with the aid of control device 16.

The mode of operation of devices 1; 1' according to the first and second specific embodiments is explained in greater detail below with reference to FIGS. 6 through 9.

Figure 6:
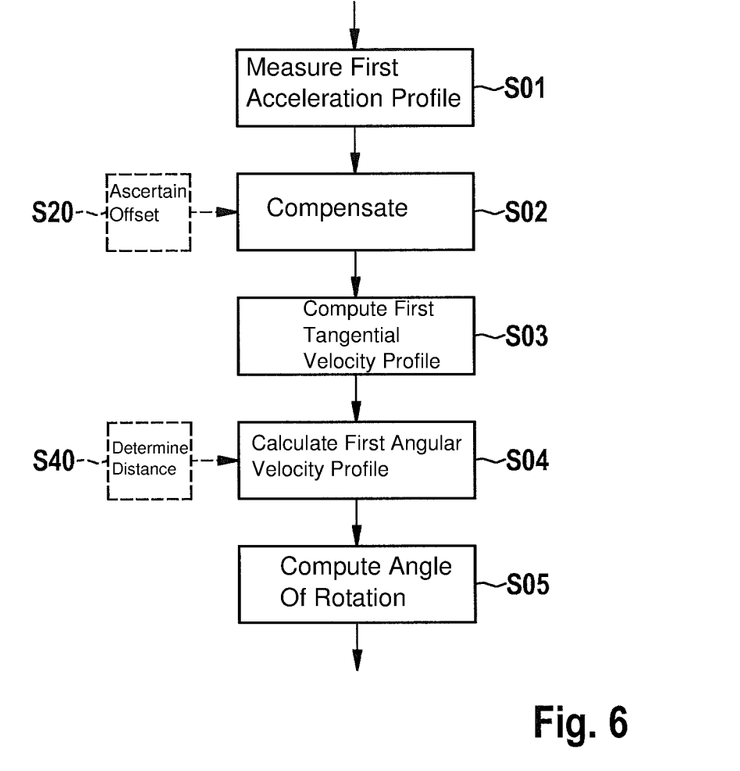
FIG. 6 shows a schematic flow chart for explaining a method according to a third specific embodiment of the present invention.

FIG. 6 shows a schematic flow chart for explaining a method according to a third specific embodiment of the present invention.

A first acceleration profile of acceleration sensor 10 mounted on object 12 is measured during a first period of time in a first step S01. The first period of time may begin with the awakening of acceleration sensor 10 from a standby mode, for example controlled by control device 16 and/or based on a measured movement. Acceleration sensor 10 may conserve energy, i.e., electric current, via the standby mode. A wake-up time of the acceleration sensor, i.e., a reaction time between a signal for awakening from the standby mode and a point in time at which the measuring may begin, is advantageously particularly short.

An offset, i.e., a systematic inaccuracy or a systematic measuring error of acceleration sensor 10, may be compensated for in an optional method step S02. For this purpose, the offset of acceleration sensor 10, in particular an offset in the x direction, may be ascertained in multiple method steps S20, for example, as described below with reference to FIG. 7. Compensation S02 may include recalibration of acceleration sensor 10 so that it no longer has the determined offset during subsequent measurements. With regard to the measured first acceleration profile, compensation S02 of the determined offset means in particular that it is not the raw measured first accelerations $a_{x,raw}$ that are used as actual accelerations in the x direction $a_x(t)$ at a point in time t, but, rather:

$$a_x(t)=a_{x,raw}(t)-a_{x,offset}.$$

A first tangential velocity profile $v_x$ of acceleration sensor 10 according to the measured first acceleration profile is computed in a method step S03. In particular, the computation may take place according to the following formula, where $T_0$ is the point in time at the beginning of the first period of time, and $T_1$ is a point in time during the first period of time:

$$v_x(T_1)=v_0+\int_{T_0}^{T_1}a_x(t)dt.$$

$v_x(T_1)$ is the tangential velocity of acceleration sensor 10 with respect to rotation axis D in the x direction at point in time $T_1$. $v_0$ is a constant initial tangential velocity, which may be 0, for example, if the first period of time begins with the motion of object 12 from a neutral state.

Computed tangential velocity $v_x(T_1)$ is proportional to a first angular velocity about rotation axis D of acceleration sensor 10. The proportionality factor is distance d of acceleration sensor 10 from rotation axis D.

A first angular velocity profile about rotation axis D is computed in a method step S04 according to the first tangential velocity profile and based on predetermined distance d of acceleration sensor 10 from rotation axis D. Distance d may optionally be determined in method steps S40, as described below with reference to FIG. 8. Alternatively, distance d may be manually measured and programmed into the computing device which carries out computation S04 of the first angular velocity profile. The first angular velocity profile may be computed with the aid of the following formula:

$$\omega_D(T_1)=\frac{1}{d}\left(v_0+\int_{T_0}^{T_1}a_x(t)dt\right),$$

i.e., integration is performed over measured first accelerations $a_x$. $\omega_D(T_1)$ is the angular velocity about rotation axis D at point in time $T_1$.

Angle of rotation α by which object 12 has rotated about rotation axis D during the first period of time is computed in a method step S05, based on the computed first angular velocity profile. The following formula may be used for this purpose:

$$\alpha(T_{end})=\alpha_0+\int_{T_0}^{T_{end}}\omega_D(T_1)dT_1).$$

i.e., integration is performed over the computed first angular velocities. $T_{end}$ is the point in time at which the first period of time ends, and $\alpha_0$ is a constant initial angle of rotation which object 12 has assumed with respect to neutral position L. Initial angle of rotation $\alpha_0$ may be known, for example, from a previous use of the method according to the present invention, and/or may have been stored in the computing device.

Figure 7:
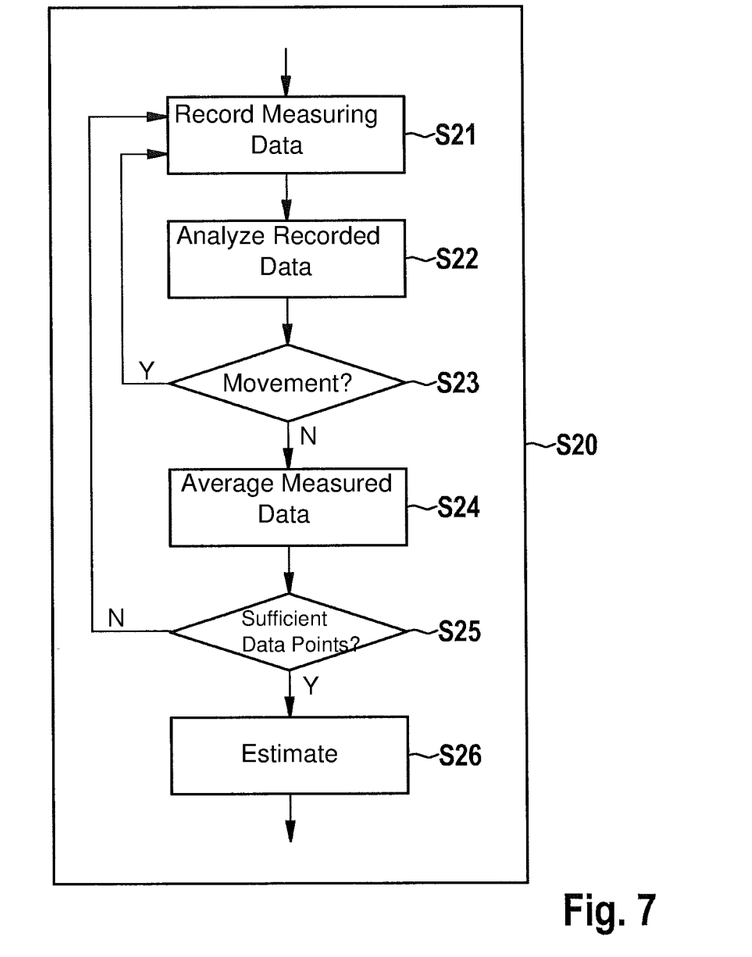
FIG. 7 shows a schematic flow chart for explaining method components for ascertaining a sensor offset according to a fourth specific embodiment of the present invention.

FIG. 7 shows a schematic flow chart for explaining method components for ascertaining an offset of a sensor 10, 14 according to a fourth specific embodiment of the present invention.

According to FIG. 7, at least one sensor offset is ascertained in a series of method steps S20. This may be an offset of acceleration sensor 10, but may also be an offset of rotation rate sensor 14 of device 1'.

Measuring data of sensor 10, 14 are recorded in a method step S21. This means that accelerations or an acceleration profile are/is measured by acceleration sensor 10, and/or rotation rates are measured with the aid of rotation rate sensor 14.

The recorded data are analyzed in a method step S22, for example with the aid of a microcontroller connected to sensor 10, 14.

A check is made in a method step S23 as to whether a movement has been determined, for example with the aid of the microcontroller, based on analysis S22. If a movement has been determined, the method for determining the sensor offset returns to method step S21. However, if no movement has been determined, the measured sensor data, i.e., accelerations and/or rotation rates or angular velocities, are averaged.

A check is made in a method step S25 as to whether sufficient data points, i.e., measuring results, are available according to predetermined criteria to be able to provide an offset estimation having a desired accuracy. If this is not the case, the system returns to method step S21. However, if sufficient data points are present, the sensor offset is estimated in a method step S26. Estimation S26 may be based on an extrapolation of the time curve of computed S24 average value of the sensor data. Estimated S26 sensor offset(s) may be compensated for in method step S02.

Determination S20 of the offset of acceleration sensor 10 and/or of rotation rate sensor 14 may be carried out once, for example during initial start-up of the device according to the present invention, or on a regular or continuous basis. For example, fixed time periods may be specified, within which the method described with reference to FIG. 6 is carried out on a regular basis, so that compensation S02 of the determined offset may also be carried out on a regular basis, thus making the method according to the present invention more accurate.

Figure 8:
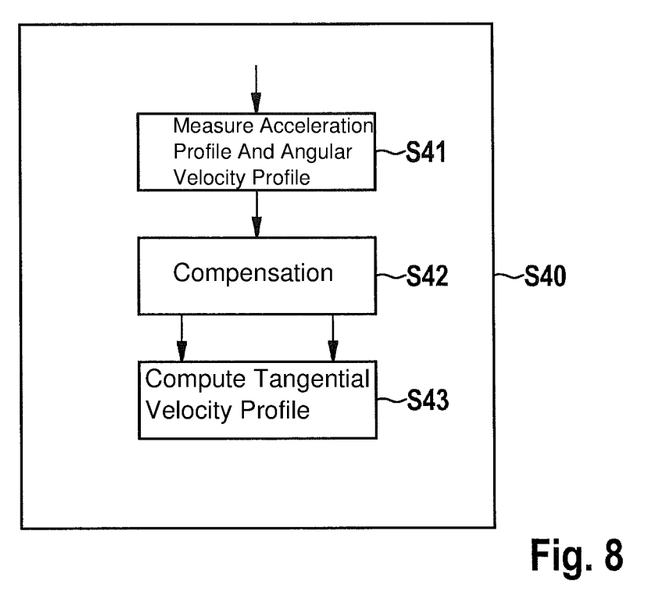
FIG. 8 shows a schematic flow chart for explaining method steps for determining the distance of the acceleration sensor from the rotation axis according to another specific embodiment of the present invention.

FIG. 8 shows a schematic flow chart for explaining method steps for determining the distance of acceleration sensor 10 from rotation axis D according to another specific embodiment of the present invention.

According to the specific embodiment described with reference to FIG. 6, distance d of acceleration sensor 10 from rotation axis D is measured manually and thus provided. According to another specific embodiment, which is a variant of the third specific embodiment, distance d may also be determined automatically in multiple method steps S40, as explained below with reference to FIG. 8.

An acceleration profile of accelerations $a_x$ of acceleration sensor 10 in the x direction is measured with the aid of acceleration sensor 10, and an angular velocity profile of angular velocities $\omega_D^{meas}$ of a rotation about rotation axis D is measured with the aid of rotation rate sensor 14, in a step S41.

Predetermined offsets of sensors 10, 14 may be compensated for in an optional step S42, for example as described above with reference to method steps S20.

A tangential velocity profile of tangential velocities $v_x$, i.e., velocities in the x direction of acceleration sensor 10, is computed, for example as described with reference to step S03, in a step S43, for example by integration of accelerations $a_x$ with the aid of the computing device. Distance d may be determined based on measured angular velocity profile $\omega_D^{meas}$ and computed tangential velocity profile $v_x$, for example using a Kalman filter during the normal use of object 12. Distance d may be easily ascertained using the following formula, for example:

$$d = \frac{v_x(t)}{\omega_D(t)},$$

where t is an arbitrary point in time. Distance d may be determined recursively for multiple points in time t with the aid of a Kalman filter, the computed value of distance d increasingly approximating the actual value as the method proceeds.

Method steps S40 may be carried out on object 12 during a calibration and/or a setup of the device according to the present invention. However, it may also be provided to carry out the method on a regular or continuous basis, or the method may be carried out (again) on request of a user.

Alternatively or additionally (for plausibility checking, for example), distance d of acceleration sensor 10 from rotation axis D may be determined by acceleration sensor 10 also measuring an acceleration in the y direction as well as in the radial direction with respect to rotation axis D. With knowledge of angular velocity profile $\omega_D$ and/or $\omega_D^{meas}$, distance d may be computed from the centripetal forces experienced by acceleration sensor 10.

Figure 9:
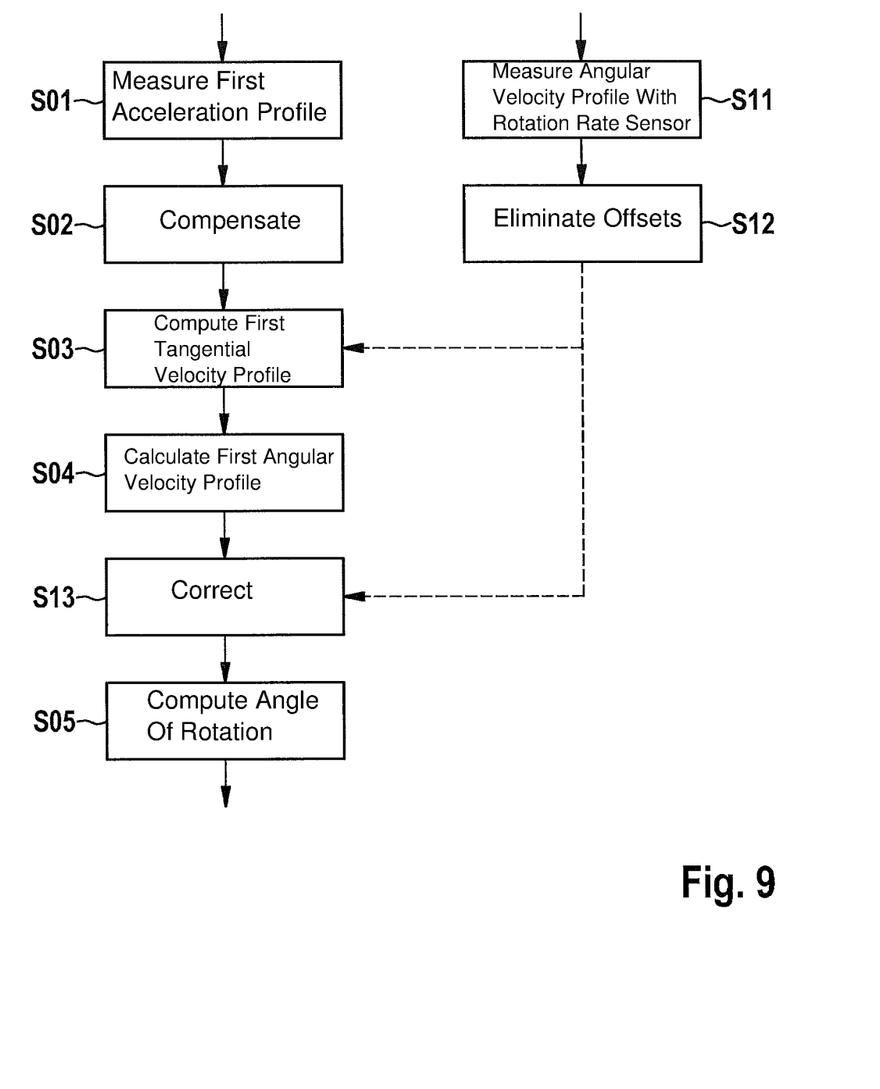
FIG. 9 shows a schematic flow chart for explaining a method according to a fifth specific embodiment of the present invention.

FIG. 9 shows a schematic flow chart for explaining a method according to a fifth specific embodiment of the present invention.

The fifth specific embodiment is a variant of the third specific embodiment, and differs from the third specific embodiment in that in addition, a rotation rate sensor 14 provided on object 12 is used.

An angular velocity profile $\omega_D^{meas}$ is measured in a step S11 with the aid of rotation rate sensor 14.

Offsets of rotation rate sensor 14 are eliminated in an optional step S12, for example in that angular velocities $\omega_D^{meas}$ of the angular velocity profile to be further processed are the measured angular velocities minus predetermined rotation rate sensor offsets.

Steps S11 and S12 are advantageously carried out less frequently than the remaining steps of the method according to the fifth specific embodiment. For example, the remaining steps could take place at a frequency of 100 Hz, while steps S11 and S12 are carried out at a frequency of 1 Hz, i.e., at only one-hundredth the frequency. The rotation rate sensor, which is controlled by control device 16, is advantageously activated or awakened from an energy-saving standby mode only for measurement S11, and immediately placed back into the standby mode after measurement S11. The power consumption for the method may be reduced considerably in this way.

After computation S04 of the first angular velocity profile about rotation axis D according to the first tangential velocity profile, according to the third specific embodiment a correction of the first angular velocity profile may take place in a step S13. During correction S13 of the angular velocity profile, angular velocities $\omega_D$ of the computed first angular velocity profile are compared to measured angular velocities $\omega_D^{meas}$ (preferably after offset correction). If the values differ from one another by more than a predetermined tolerance, it may be provided that measured angular velocity profile $\omega_D^{meas}$ is used instead of computed first angular velocity profile $\omega_D$ for computation S05 of the angle of rotation.

Alternatively, during correction S13 of the first angular velocity profile, an average value between computed angular velocities $\omega_D$ of the first angular velocity profile and the angular velocities of measured angular velocity profile $\omega_D^{meas}$ (preferably after offset correction) may be formed and subsequently used in the method.

Measured angular velocities $\omega_D^{meas}$ are also used for improving the calibration of acceleration sensor 10. For example, initial velocity $v_0$ of acceleration sensor 10 may be computed from measured first angular velocity profile $\omega_D^{meas}$ and predetermined distance d of acceleration sensor 10 from rotation axis D. Computation S03 of the first tangential velocity profile of acceleration sensor 10 may thus become even more precise.

Further differences between the computed and the measured angular velocity profiles may also be used for calibrating acceleration sensor 10 on a regular basis, i.e., eliminating further offsets.

Although the present invention has been described with reference to preferred exemplary embodiments, it is not limited thereto, and may be modified in numerous ways. In particular, the present invention may be changed or modified in various ways without departing from the core of the present invention.

For example, the computing device may also be provided as part of device 1; 1'. The connection between device 1; 1' and the computing device may be wired, or may also take place via wireless interfaces, for example WLAN, Wi-Fi, Bluetooth, ZigBee, infrared interfaces, and the like.

After the distance of acceleration sensor 10 has been automatically determined with the aid of method steps S20, unfavorable positioning of acceleration sensor 10, for example, too small a distance from rotation axis D, may be indicated. The indication may take place, for example, on a display of the computing device. However, with the aid of a sound generator, device 1; 1' may also generate beeps which simplify the optimal placement of the acceleration sensor, or at least indicate unfavorable positioning.

What is claimed is:

1. A method for determining an angle of rotation of an object about a rotation axis, comprising:
   measuring, by an acceleration sensor, a first acceleration profile of the acceleration sensor mounted on the object during a first period of time; and
   computing, by a computing device, the angle of rotation by which the object has rotated about the rotation axis during the first period of time based on the first acceleration profile during the first period of time, and based on a predetermined distance of the acceleration sensor from the rotation axis,
   computing a first tangential velocity profile of the acceleration sensor according to the measured first acceleration profile; and
   computing a first angular velocity profile about the rotation axis according to the first tangential velocity profile, and based on the predetermined distance of the acceleration sensor from the rotation axis;
   wherein the computation of the angle of rotation is based on the computed first angular velocity profile,
   determining the distance of the acceleration sensor from the rotation axis, the determining including:
      measuring a second acceleration profile of the acceleration sensor during a second period of time;
      measuring a second angular velocity profile during the second period of time with the aid of a rotation rate sensor mounted on the object;
      computing a second tangential velocity profile of the acceleration sensor according to the measured second acceleration; and
      computing the distance of the acceleration sensor from the rotation axis, based on the computed second tangential velocity profile and the measured second angular velocity profile,
   determining an offset of the acceleration sensor; and
   compensating for the determined offset of the acceleration sensor via recalibration of the acceleration sensor.

2. The method as recited in claim 1, further comprising:
   measuring a third angular velocity profile of the object about the rotation axis with the aid of a rotation rate sensor mounted on the object; and
   correcting the computed first angular velocity profile based on the measured third angular velocity profile.

3. The method as recited in claim 2, wherein the measurement of the third angular velocity profile is carried out less frequently than the measurement of the first acceleration profile and the rotation rate sensor for the measurement of the third angular velocity profile in each case is awakened from an energy-saving standby mode, and in each case is placed back into the standby mode after the third angular velocity profile is measured.

4. The method as recited in claim 1, wherein one of the object is a door and the rotation axis extends through hinges of the door, or the object is a window and the rotation axis extends through hinges of the window.

5. The method as recited in claim 4, wherein based on the computed angle of rotation and a predetermined angle of rotation threshold value, ascertaining whether the door or the window is open or closed, and depending on the result of the ascertainment, an OPEN/CLOSED signal is generated.

6. A device for determining an angle of rotation of an object about a rotation axis, comprising;
   an acceleration sensor configured to be mounted on the object; and
   a computing device configured to:
      determine the angle of rotation based on an acceleration profile measured by the acceleration sensor during a period of time, and based on a predetermined distance of the acceleration sensor from the rotation axis,
      compute a first tangential velocity profile of the acceleration sensor according to the measured first acceleration profile; and
      computing a first angular velocity profile about the rotation axis according to the first tangential velocity profile, and based on the predetermined distance of the acceleration sensor from the rotation axis;
      wherein the computation of the angle of rotation is based on the computed first angular velocity profile;
      determine the distance of the acceleration sensor from the rotation axis, the determining including:
         measuring a second acceleration profile of the acceleration sensor during a second period of time;
         measuring a second angular velocity profile during the second period of time with the aid of a rotation rate sensor mounted on the object;
         computing a second tangential velocity profile of the acceleration sensor according to the measured second acceleration; and
         computing the distance of the acceleration sensor from the rotation axis, based on the computed second tangential velocity profile and the measured second angular velocity profile;
      determining an offset of the acceleration sensor; and
      compensating for the determined offset of the acceleration sensor via recalibration of acceleration sensor.

7. The device as recited in claim 6, further comprising:
   a control device; and
   a rotation rate sensor designed to measure an angular velocity profile of the object about the rotation axis, and which may be placed into an energy-saving standby mode and awakened again from the standby mode by the control device.

* * * * *